United States Patent [19]

Orain

[11] 4,365,686

[45] Dec. 28, 1982

[54] TRANSMISSION SHAFT FOR A FRONT WHEEL DRIVE VEHICLE HAVING AN AUTOMATIC GEAR BOX

[75] Inventor: Michel A. Orain, Conflans-Ste. Honorine, France

[73] Assignee: Glaenzer Spicer, Poissy, France

[21] Appl. No.: 100,405

[22] Filed: Dec. 5, 1979

[30] Foreign Application Priority Data

Dec. 18, 1978 [FR] France ................. 78 35576

[51] Int. Cl.³ ............................................ B60K 17/30
[52] U.S. Cl. ...................................... 180/256; 64/113
[58] Field of Search ................. 180/256, 297; 64/1 V, 64/1 C, 1 R

[56] References Cited

U.S. PATENT DOCUMENTS

| 1,965,742 | 7/1934 | Junkers | 64/1 C |
| 2,394,405 | 2/1946 | Schjolin | 64/1 V |

FOREIGN PATENT DOCUMENTS

| 1158732 | 6/1958 | France . | |
| 1290685 | 3/1962 | France . | |
| 1373805 | 8/1964 | France . | |
| 743564 | 1/1956 | United Kingdom . | |

Primary Examiner—Joseph F. Peters, Jr.
Assistant Examiner—Ross Weaver
Attorney, Agent, or Firm—Wenderoth, Lind & Ponack

[57] ABSTRACT

This transmission shaft comprises a first transmission element having high torsional elasticity which is rigidly connected to rotate at its ends with the output shaft of the engine unit of the vehicle and a front wheel, and a second transmission element having a low torsional elasticity coaxial with the first transmission element. The second transmission element has one end rigidly connected to rotate with the wheel and another end connected to the shaft through a connection which has an angular play between two predetermined values of the torque applied to the shaft. The drag torque applied to the shaft when the engine is idling and the vehicle is held stationary by the brakes, is between these two values.

8 Claims, 7 Drawing Figures

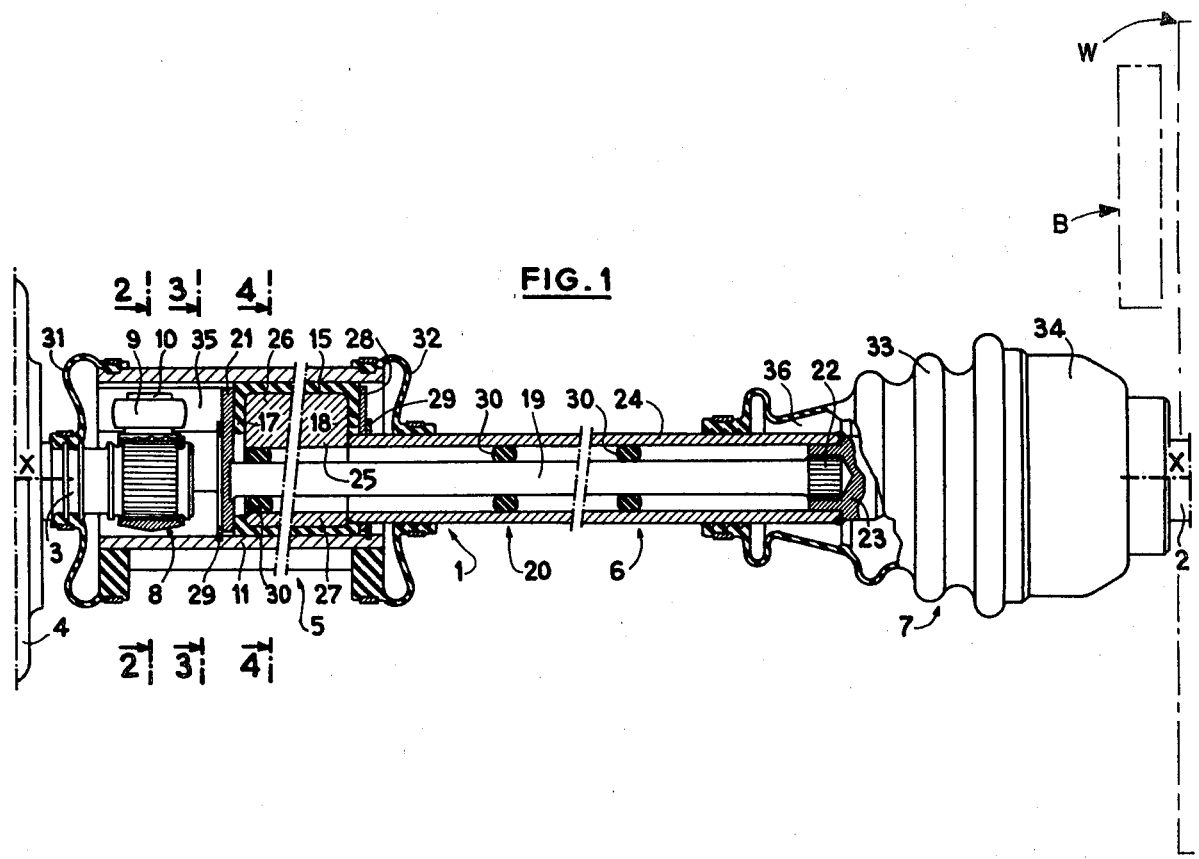

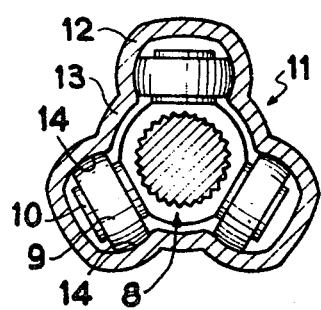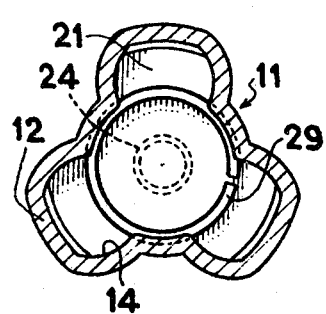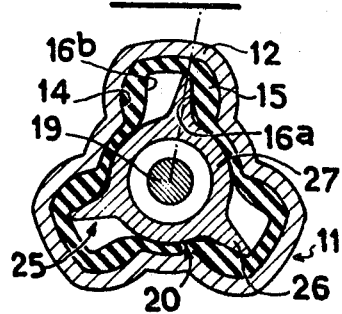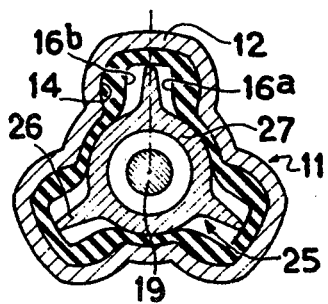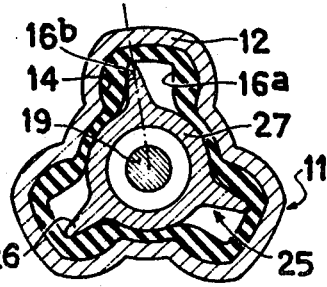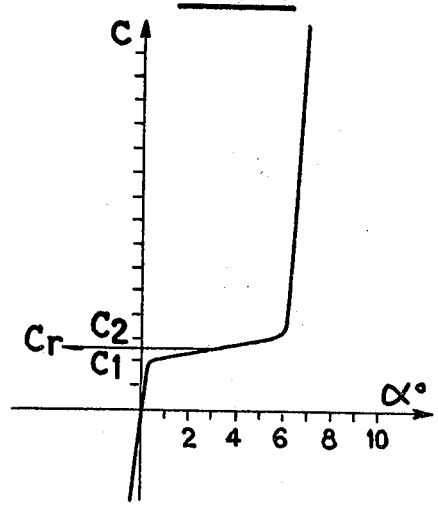

TRANSMISSION SHAFT FOR A FRONT WHEEL DRIVE VEHICLE HAVING AN AUTOMATIC GEAR BOX

The present invention relates to transmission shafts which are employed in front wheel drive vehicles having an automatic gear box between the engine unit and the front wheels.

It is known that the use of an automatic gear box in front wheel drive vehicles presents a particular problem of the insulation of the engine unit from the body of the vehicle, especially when the engine is of the Diesel type, under the following conditions: with the vehicle stationary, held with the foot brake and the engine running at idling speed, when the driver puts the automatic gear box into the drive position (forward speed), the hydraulic coupling or converter delivers at its output shaft its drag torque Cr, of about 10 kilogram meters; this torque is applied to the front wheels through the transmission shaft.

However, for reasons of torsional strength and stiffness against bending, the transmission shaft is very rigid in torsion. Consequently, it transmits practically without damping to the wheels, and to the body through the brakes, the torque peaks ΔCr produced by the explosions of the engine and amplified, when the engine is placed transversely, by the tilting rotaton of the latter on its elastically yieldable suspension owing to the lateral action of the pistons.

It might be thought that, in order to avoid transmission of these torque peaks and the pivotal rotations of the engine unit to the wheels and the body of the vehicle, high flexibility in torsion could be given to the transmission, for example 1° to 3° of torsion per kilogram meter of torque. But this solution is not valid since the mean torque corresponding to these peaks is only 1/10th or 1/20th of the torque that the transmission must resist without breaking. It will be understood that it is impossible to impart to a conventional shaft both high elasticity in torsion for a torque of 10 kilogram meters and a sufficient strength for the maximum torque. In any case, even if it were possible to find exceptional materials satisfying this double condition, the rotation for exerting the torque would be such that oscillating movements or hunting would be inevitable when the vehicle moves off bearing in mind the inertias at each end of the transmission shaft.

An object of the invention is to provide a transmission shaft which satisfies both the apparently contradictory conditions mentioned hereinbefore.

According to the invention, there is provided a transmission shaft for a front wheel drive vehicle having an automatic gear box, the transmission shaft comprising a first transmission element having high torsional elasticity which is rigidly connected at its ends for rotation with the output shaft of the engine unit and with a front wheel, and a second transmission element having a low torsional elasticity and coaxial with the first element, said second element being at one end rigidly connected to rotate with the wheel and at its other end connected to the output shaft of the engine unit through a connection having an angular play between two predetermined values of the torque applied to said shaft, the torque applied to said shaft with the engine idling and the vehicle braked being between said two values.

Such a transmission shaft has high torsional elasticity between two torque values C1 and C2 on each side of the torque Cr corresponding to the "drag" of the converter when the engine is idling and the vehicle is braked, and, for torques less than C1 and greater than C2, it loses the major part of its torsional elasticity.

The first transmission element may in particular be pre-stressed torsionally so as to regulate the value of said predetermined torques.

Preferably, the connection between the output shaft of the engine unit and the second transmission element is achieved by means of a flexible lining.

Further features and advantages of the invention will be apparent from the ensuing description which is given merely by way of example with reference to the accompanying drawings in which:

FIG. 1 is a view, partly in axial section, front wheel drive transmission provided with a shaft according to the invention;

FIGS. 2 to 4 are cross-sectional views of the transmission of FIG. 1 taken respectively on lines 2—2, 3—3 and 4—4 of this Figure;

FIGS. 5 and 6 are views similar to FIG. 4 of the relative positions of the two elements of the transmission shaft in two different conditions of operation of the transmission;

FIG. 7 is a graph illustrating the mechanical properties of the transmission of FIG. 1, the applied engine torque being plotted as ordinates and the angle of torsion as abscissae.

The transmission 1 of FIGS. 1 to 4 is provided in a vehicle front wheel drive having an automatic gear box. It connects to the stub axle 2 of a front wheel of the vehicle the output shaft 3 of the differential 4 associated with the gear box. The wheel W and its associated brake B are diagrammatically shown in FIG. 1. It will be understood that a similar transmission is provided for driving the other front wheel. The transmission 1 comprises in succession a tripod type slidable homokinetic joint 5, a transmission shaft 6 and another tripod type non-slidable homokinetic joint 7. For reasons of clarity, all the elements have been centered on the same axis X—X, although the joints 5 and 7 give the transmission a double articulation.

The joint 5 is of the slidable type. It comprises a tripod element 8 fixed to the end of the shaft 3, the three part-spherical rollers 9 of which are journalled on the three cylindrical radial trunnions 10 by means of needle bearings. A tulip element 11 of the joint 5 is formed by a tubular sleeve which is open at both ends and whose internal cross-sectional shape (FIGS. 2 to 4) is constant from one end to the other and has three lobes 12 which are interconnected by cylindrical sectors 13. Each lobe 12 defines internally two raceways 14 having the shape of sectors of a cylinder of the same radius as the rollers 9. As can be seen in FIG. 2, each roller 9 is received in a lobe 12 and is slidable in the half of the sleeve 11 adjacent to the differential 4.

The other half of the sleeve 11 contains an elastic and flexible lining 15 of elastomer. This lining (FIG. 4) has the general shape of a tubular sleeve which externally marries up with the inner shape of the sleeve 11 and has a thickness which is substantially uniform. However, this thickness is slightly increased in the region of the raceways 14 so as to internally define planar bearing faces 16a and 16b. This sleeve is completed by two radial flanges, namely an inner flange 17 and outer flange 18, which are part of the sleeve and each have a circular centre opening.

The transmission shaft 6 comprises two main elements 19 and 20. The element 19 is a round bar of hardened steel or of another material having high elastic properties, one end of the bar being fixed to a radial plate 21 rigidly connected to rotate with the sleeve 11. For this purpose (FIG. 3), the shape of the plate 21 is mainly conjugate to the inner shape of the sleeve 11 with however a radial clearance at the bottom of the lobes of the latter. The other end of the element 19 is connected by splines 22 to the input tripod element 23 of the tripod type joint 7.

The second element 20 of the shaft 6 is mainly formed by a tube 24 of ordinary steel which coaxially surrounds the bar 19. One end of this tube is welded to the input element 23 of the joint 7 and there is welded on its other end a spider 25 which comprises three branches or blades 26 which radially extend from a tubular hub 27 extending the tube 24 (FIG. 4).

The spider 25 is received in the lining 15 without marked axial or radial clearance. More precisely, its two end faces are in contact with the inner face of the flanges 17 and 18 of the lining (FIG. 1), the hub 27 is in contact with three cylindrical sectors of small diameter of this lining, and the end of the branches 26 is practically in contact with the bottom of the lobes of the lining (FIG. 4). On the other hand, the width of the branches 26 in cross section is much less than that of the lobes defined inside the lining 15. More precisely, the angular play or clearance for these branches is preferably between 6° and 20°.

A retaining plate 28 of the same shape as the plate 21 adjoins the outer face of the flange 18 of the lining. The plate 21, the flange 17, the spider 25, the flange 18 and the plate 28 are maintained against each other, in this order, without marked clamping, by two circlips 29 which are received in grooves formed in the cylindrical sectors 13 of the sleeve 11, as shown in FIG. 3.

The angular setting of the tube 24 relative to the bar 19 is such that, in the absence of any outside torque, the branches 26 of the spider are applied against the planar surfaces 16a of the lining 15 with an inner pre-stressing torque Co which is slightly lower than the lower limit C1 of the instantaneous torque applied to the bar 19 by the shaft 3, the tripod element 8, the sleeve 11 and the plate 21 when the engine is idling, the forward speed of the gear box is engaged and the vehicle is maintained stationary by the brakes.

A few elastically yieldable guide rings 30 centre the bar 19 in the tube 24. One of the rings 30 is disposed in the vicinity of the free end of the spider 25 and fills in a sealed manner the annular space between the hub 27 of the spider and the bar 19.

Three gaiters 31 to 33 are provided. The gaiter 31 is fixed to the shaft 3 and to the sleeve 11, the gaiter 32 to the sleeve 11 and to the tube 24, the gaiter 33 to the tube 24 and to the output tulip element 34 of the homokinetic joint 7. These gaiters define with the shaft 3, the tube 24 and the tulip element 34 two sealed enclosures 35 and 36 containing a suitable lubricant. These enclosures constitute the whole of the space defined by the gaiter 31 and the tulip 34 except for the annular space between the spider 25 and the tube 24 on one hand, and the bar 19 on the other.

Under the idling conditions mentioned hereinbefore, the torque C exerted on the tripod element 8 is transmitted to the sleeve 11, to the plate 21 and to the bar 19. Owing to the torsional flexibility of the latter, the sleeve 11 and the plate 21 turn through a certain angle and drive the lining 15 therewith. As $C > Cl > Co$, this lining slightly moves away from the spider 25. When the torque varies in a cyclic manner between C1 and C2 under the effect of the explosions and movements of the engine, the torsional elasticity of the bar 19 is such that, in relative position, the branches of the spider oscillate in the lobes of the lining 15 about a mean position shown in FIG. 5, without touching the bearing surfaces 16a and 16b. To achieve this result, the angular clearance for the branches of the spider 25 must be sufficient, bearing in mind the amplitude of the oscillations and also the possible variations in the torque of the engine when idling. The aforementioned value, that is to say a free oscillation of the order of $\pm 3°$ to $\pm 10°$ is suitable.

Note that the lubricant fills in particular the lobes of the lining 15 and bathes the branches of the spider 25 and thus contributes to the damping of the oscillations during the critical period corresponding to the torque Cr.

When the full engine torque is applied by the driver for causing the vehicle to move off after releasing the brakes, the torsion of the bar 19 becomes rapidly sufficient for the lining 15 to bear against the branches of the spider 25 by its planar surfaces 16b opposed to the surfaces 16a, as shown in FIG. 6. Then, as the engine torque C increases beyond the value C2 at which this new contact is produced, the torque C-C2 is transmitted to the tripod element 23 of the joint 7 by the spider 25 and the tube 24 whose torsional elasticity is much lower. In particular, practically the whole of the starting torque is transmitted in this way. Irrespective of the value of the torque C, it is therefore ensured that no torque higher than C2 is exerted on the bar 19 which fixes the upper limit of the stresses to which this bar is subjected.

The behaviour of the transmission 1 may be summarized in the following way with reference to FIG. 7:

for an engine torque between C1 and C2 (engine idling and vehicle braked), it is the bar 19 which transmits all of the torque while highly damping the vibrations;

for an engine torque higher than C2, in normal operation of the vehicle, it is the much less elastic tube 24 which imposes its law; the transmission is much more rigid but also much stronger; however, it affords a certain damping which is beneficial in respect of vibrations of higher frequency which may occur under the driving conditions on the road.

The interest of such a transmission will now be illustrated by a numerical example.

Let it be assumed that Cr=12 m.kg and that the shaft 3 of the differential oscillates by $\pm 1°$ under the effect of the explosions. Calculation shows that a conventional transmission shaft of diameter D=22 mm and length L=400 mm would have a torsional elasticity equal to 0.00217 rad/m.kg and that consequently the parasitic alternating torque transmitted to the wheel, and through the brake to the body of the vehicle, would be equal to $\pm 8.042$ m.kg.

In respect of a shaft according to the invention whose elastic bar 19 has a diameter D=10 mm and a length L=350 mm, the torsional elasticity is equal to 0.0445 rad/m.kg. which corresponds to an alternating residual torque applied to the wheel which is equal to $\pm 0.392$ m.kg.

Thus it is clear that the parasitic alternating torque is 1/20th of that of a conventional shaft and this result is obtained in a cheap and lasting manner.

Having now described my invention what I claim as new and desire to secure by Letters Patent is:

1. A structure comprising in combination transmission shaft means, a vehicle front wheel drive comprising a front wheel, brake means for said wheel and an engine-automatic gear box-differential assembly which has an output shaft, said output shaft carrying a male member of a slidable tripod-type joint, said assembly being liable to produce a drag torque on said output shaft when the engine is idling and said brake means hold the wheel stationary, a tulip element of said slidable tripod type joint, the tulip element being in the form of a tubular sleeve whose internal cross-sectional shape comprises three lobes, the lobes co-operating with respective rollers of said male member in a first part of the longitudinal length of the sleeve, the shaft means comprising a first transmission element which has a high torsional elasticity, first connecting means connecting one end of the first transmission element to rotate with said tulip member, an opposite end of the first transmission element being connected to rotate with said front wheel, a second transmission element which has a torsional elasticity lower than said high torsional elasticity and is coaxial with the first transmission element and has one end connected to rotate with said front wheel, and second connecting means connecting an opposite end of the second transmission element to said tulip member, said second connecting means allowing a limited angular rotational play between said opposite end of the second transmission element and said tulip member between two predetermined relative positions corresponding to positive values of vehicle driving torque applied to said shaft means by said output shaft, said drag torque having a value which is between said two values, said second connecting means comprising radial projections on the second transmission element which are evenly circumferentially spaced apart, are respectively of smaller angular extent than said lobes and are respectively received in said lobes in a second part of the longitudinal length of the sleeve.

2. A structure as claimed in claim 1, wherein said first connecting means comprises a radially extending plate which is fixed to said one end of the first transmission element and has a cross-sectional shape which is conjugate to the inner cross-sectional shape of said sleeve so as to be connected to rotate with said sleeve.

3. A transmission shaft as claimed in claim 2, wherein said second connecting means comprises a flexible lining in said second part of the sleeve through which lining the connection is achieved between said sleeve and the second transmission element.

4. A structure as claimed in claim 1, wherein the first transmission element is torsionally pre-stressed so as to regulate said two predetermined values of torque.

5. A structure as claimed in claim 1, wherein said second connecting means comprise a flexible lining through which lining the connection is achieved between said output shaft and the second transmission element.

6. A structure as claimed in claim 1, wherein the first transmission element is a round bar of hardened steel and the second transmission element comprises a tube of ordinary steel.

7. A structure as claimed in claim 1, wherein said angular play is between 6° and 20°.

8. A structure comprising in combination transmission shaft means, a vehicle front wheel drive comprising a front wheel, brake means for said wheel and an engine-automatic gear box-differential assembly which has an output shaft, said output shaft carrying a male member of a homokinetic joint, said assembly being liable to produce a drag torque on said output shaft when the engine is idling and said brake means hold the wheel stationary, a female member of said homokinetic joint, the female member being in the form of a tubular sleeve whose internal cross-sectional shape comprises lobes, the lobes co-operating with respective rolling elements of said homokinetic joint in a first part of the longitudinal length of the sleeve, the shaft means comprising a first transmission element which has a high torsional elasticity, first connecting means connecting one end of the first transmission element to rotate with said female member, an opposite end of the first transmission element being connected to rotate with said front wheel, a second transmission element which has a torsional elasticity lower than said high torsional elasticity and is coaxial with the first transmission element and has one end connected to rotate with said front wheel, and second connecting means connecting an opposite end of the second transmission element to said female member, said second connecting means allowing a limited angular rotational play between said opposite end of the second transmission element and said female member between two predetermined relative positions corresponding to positive values of vehicle driving torque applied to said shaft means by said output shaft, said drag torque having a value which is between said two values, said second connecting means comprising radial projections on the second transmission element which are evenly circumferentially spaced apart, are respectively of smaller angular extent than said lobes and are respectively received in said lobes in a second part of the longitudinal length of the sleeve.

* * * * *